(12) United States Patent
McLaren et al.

(10) Patent No.: US 7,977,622 B2
(45) Date of Patent: Jul. 12, 2011

(54) TUNING AN OPTICAL RESONATOR USING A FEEDBACK SIGNAL REPRESENTING AN AVERAGE DC BALANCED CODING

(75) Inventors: Moray McLaren, Bristol (GB); Normal Paul Jouppi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 378 days.

(21) Appl. No.: 12/322,896

(22) Filed: Feb. 9, 2009

(65) Prior Publication Data

US 2010/0200733 A1 Aug. 12, 2010

(51) Int. Cl.
*G01J 1/04* (2006.01)
*H04J 14/02* (2006.01)
(52) U.S. Cl. ..................... 250/227.11; 398/95
(58) Field of Classification Search ............. 250/214 C, 250/206, 214 R, 214 A, 214 AL, 214.1, 214 DC, 250/216, 227.11, 227.24, 227.28; 385/14, 385/24; 330/56; 398/14, 34, 141, 79; 359/346, 359/341.1, 341.4, 333–349; 372/20, 21, 29.011, 64

See application file for complete search history.

(56) References Cited

U.S. PATENT DOCUMENTS

| | | | | | |
|---|---|---|---|---|---|
| 4,592,043 | A | * | 5/1986 | Williams | 398/79 |
| 4,715,028 | A | * | 12/1987 | McMahon et al. | 398/60 |
| 5,351,252 | A | * | 9/1994 | Toyama et al. | 372/29.021 |
| 6,295,272 | B1 | * | 9/2001 | Feldman et al. | 370/210 |

* cited by examiner

*Primary Examiner* — Que T Le
*Assistant Examiner* — Jennifer Bennett

(57) ABSTRACT

Various embodiments of the present invention relate to systems and methods for monitoring and tuning detector and modulator resonators during operation. Aspects of the present invention use DC balanced coding of data in optical signals tune and monitor the performance of a resonator. Whether the resonator is being used as a modulator or a detector, the intensity of the light coupled into the resonator is DC balanced and varies as a function of the data being transmitted. Average intensity variations of the light scattered from the resonator are converted into an electronic feedback signal, which is used to determine appropriate levels of thermal and electronic tuning applied to the resonator.

15 Claims, 11 Drawing Sheets

TUNING AN OPTICAL RESONATOR USING A FEEDBACK SIGNAL REPRESENTING AN AVERAGE DC BALANCED CODING

TECHNICAL FIELD

Embodiments of the present invention relate generally to systems and methods for performing ring resonator tuning.

BACKGROUND

In recent years, ring resonators ("resonators") have increasingly been employed as essential components in optical networks and other nanophotonic systems that are integrated with electronic devices. A resonator can ideally be configured with a resonance wavelength substantially matching a particular wavelength of light. When the resonator is positioned adjacent to a waveguide within the evanescent field of light propagating along the waveguide, the resonator evanescently couples at least a portion of the particular wavelength of light from the waveguide and traps the light for a period of time. Resonators are well-suited for use in modulators and detectors in nanophotonic systems employing wavelength division multiplexing ("WDM"). These systems transmit and receive data encoded in different wavelengths of light that can be simultaneously carried by a single optical fiber or waveguide. Resonators can be positioned at appropriate points along the optical fiber or waveguide and operated to encode information by modulating unmodulated wavelengths of light and operated to detect wavelengths of light coding information and convert the encoded wavelengths into electronic signals for processing.

However, a resonator's dimensions directly affect the resonator's resonance wavelength, which is particularly important because in typical WDM systems the wavelengths may be separated by fractions of a nanometer. Environmental factors affecting a resonator's resonance wavelength include low resonator temperatures due to low ambient temperature or lack of power dissipation of neighboring circuits. In addition, even with today's microscale fabrication technology, fabricating resonators with the dimensional precision needed to insure that the resonator's resonance wavelength matches a particular wavelength of light can be difficult. These problems arise because the resonance wavelength of a resonator is inversely related to the resonator's size. In other words, the resonance wavelength of a small resonator is more sensitive to variations in resonator size than that of a relatively larger resonator. For example, a deviation of just 10 nm in the radius of a nominally 10 µm radius resonator results in a resonance wavelength deviation of 1.55 nm from the nominal resonance wavelength for which the ring resonator was designed. This 0.1% deviation approaches the limits in accuracy for fabricating resonators using optical lithography. A deviation of this magnitude is undesirable and in fact may be unacceptable in typical optical networks and microscale optical devices where the wavelength spacing may be less than 1 nm.

Systems and methods that enable one to monitor a resonator's performance during operation and accordingly tune the resonator to correct for changing environmental effects and any manufacturing defects are desired.

DETAILED DESCRIPTION

Various embodiments of the present invention relate to systems and methods for monitoring and tuning a resonator during operation. The resonance wavelength of a resonator can be coarse and fine tuned by varying the temperature and by applying an appropriate bias voltage or current across the resonator. Coarse tuning is achieved by heating the resonator to a known operating temperature using a localized heating element, and fine tuning is achieved with active electronic tuning that compensates for small variations in ambient temperature and small variations due to manufacturing defects. In order to monitor a resonator's performance and appropriately tune the resonator, embodiments of the present invention use DC balanced coding of data in optical signals. DC balanced coding ensures that over time an equal number of logic "1"s and logic "0"s are encoded in relatively high and low intensities of the optical signal. Thus, whether the resonator is being operated as a modulator or a detector, the average intensity of the light coupled into the resonator is independent of the data transmitted or received and is converted into an electronic feedback signal, which is used to determine appropriate levels of thermal and electronic tuning to apply to the resonator.

The detailed description is organized as follows. A general description of microring resonators and electronic and thermal tuning is provided in a first subsection. A description of resonator tuning systems is provided in a second subsection. A description of DC balanced coding is provided in a third subsection. Operation of a resonator tuning system is described in a fourth subsection. Finally, a control-flow diagram representing method embodiments for tuning resonators using DC balanced coding is provided in a fifth subsection.

I. Microring Resonators

Figure 1:
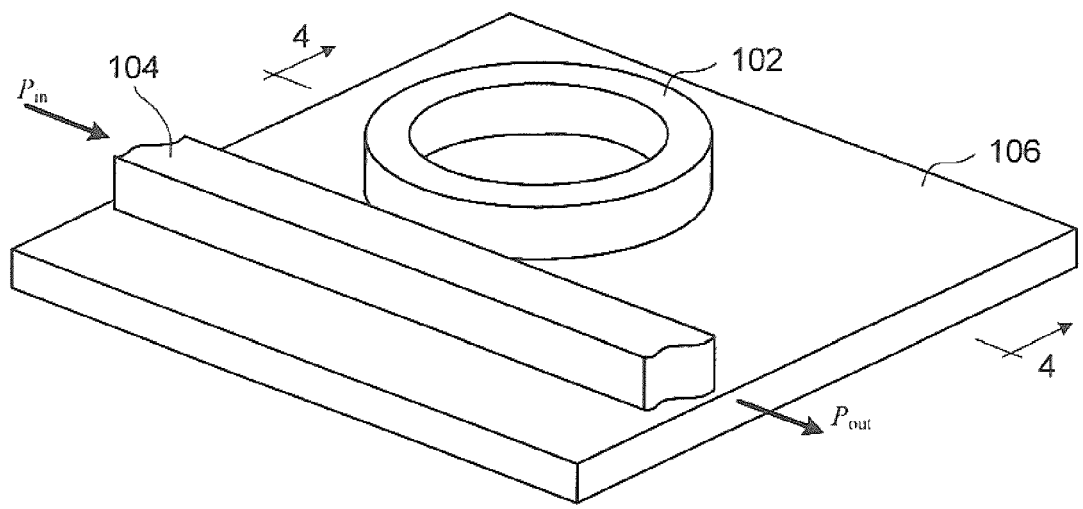
FIG. 1 shows an isometric view and enlargement of a microring resonator and a portion of an adjacent ridge waveguide configured in accordance with embodiments of the present invention.

FIG. 1 shows an isometric view and enlargement of a microring resonator 102 and a portion of an adjacent ridge waveguide 104 disposed on the surface of a substrate 106 in accordance with embodiments of the present invention. The resonator 102 and the waveguide 104 are composed of a material having a relatively higher refractive index than the substrate 106. For example, the resonator 102 can be composed of silicon ("Si") and the substrate 106 can be composed of $SiO_2$ or a lower refractive index material. Light of a particular wavelength transmitted along the waveguide 104 is evanescently coupled from the waveguide 104 into the resonator 102 when the wavelength of the light and the dimensions of the resonator 102 satisfy the resonance condition:

$$\frac{L}{m} = \frac{\lambda}{n_{eff}(\lambda, T)}$$

where $n_{eff}$ is the effective refractive index of the resonator 102, L is the effective optical path length of the resonator 102, m is an integer indicating the order of the resonance, and $\lambda$ is the free-space wavelength of the light traveling in the waveguide 104. The resonance condition can also be rewritten as $\lambda = Ln_{eff}(\lambda,T)/m$. In other words, the resonance wavelength for a resonator is a function of the resonator effective refractive index and optical path length.

Evanescent coupling is the process by which waves of light are transmitted from one medium, such as resonator, to another medium, such a ridge waveguide, and vice versa. For example, evanescent coupling between the resonator 102 and the waveguide 104 occurs when the evanescent field generated by light propagating in the waveguide 104 couples into the resonator 102. Assuming the resonator 102 is configured to support the modes of the evanescent field, the evanescent field gives rise to light that propagates in the resonator 102, thereby evanescently coupling the light from the waveguide 104 into the resonator 102.

Figure 2:
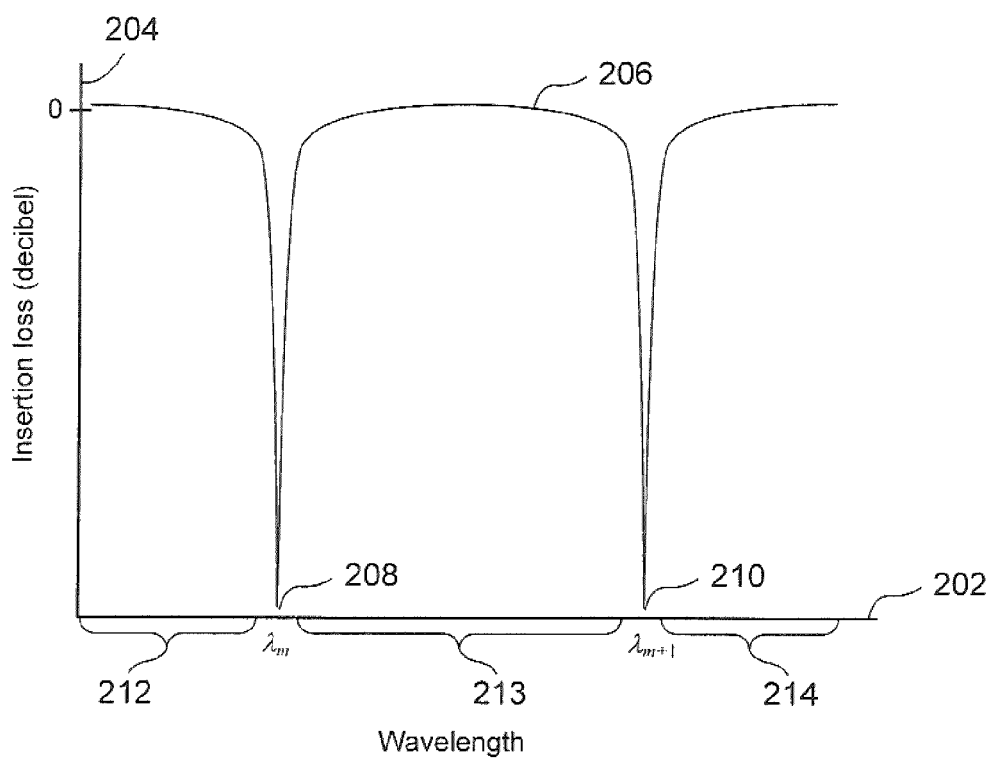
FIG. 2 shows a plot of insertion loss versus wavelength for a microring resonator and adjacent waveguide in accordance with embodiments of the present invention.

FIG. 2 shows a plot of insertion loss versus wavelength for the resonator 102 and the waveguide 104 shown in FIG. 1. Insertion loss, also called attenuation, is the loss of optical power associated with a wavelength of light traveling in the waveguide 104 coupling into the resonator 102 and can be expressed as $10 \log_{10}(P_{in}/P_{out})$ in decibels ("dB"), where $P_{in}$ represents the optical power of light traveling in the waveguide 104 prior to reaching the resonator 102, and $P_{out}$ is the optical power of light that passes the resonator 102. In FIG. 2, horizontal axis 202 represents wavelength, vertical axis 204 represents insertion loss, and curve 206 represents the insertion loss of light passing the resonator 102 over a range of wavelengths. Minima 208 and 210 of the insertion loss curve 206 correspond to wavelengths $\lambda_m = Ln_{eff}/m$ and $\lambda_{m+1} = Ln_{eff}/(m+1)$. These wavelengths represent only two of many regularly spaced minima. Wavelengths of light satisfying the resonance condition above are said to have "resonance" with the resonator 102 and are evanescently coupled from the waveguide 104 into the resonator 102. In the narrow wavelength regions surrounding the wavelengths $\lambda_m$ and $\lambda_{m+1}$, the insertion loss curve 206 reveals a decrease in the insertion loss the farther wavelengths are away from the wavelengths $\lambda_m$ and $\lambda_{m+1}$. In other words, the strength of the resonance between the resonator 102 and light traveling in the waveguide 104 decreases the farther the wavelengths are away from $\lambda_m$ and $\lambda_{m+1}$, and thus, the amount of the light coupled from the waveguide 104 into the resonator 102 decreases the farther the wavelengths are away from $\lambda_m$ and $\lambda_{m+1}$. Light with wavelengths in the regions 212-214 pass the resonator 102 substantially undisturbed.

According to the resonance condition, because the resonance wavelength $\lambda$ is a function of the optical path length L and the effective refractive index $n_{eff}$, changing the effective refractive index and/or the optical path length produces a corresponding change in the resonance wavelength of the resonator. The resonator's effective refractive index and the optical path length L can be changed by varying the resonator's temperature (i.e., thermal tuning). For thermal tuning, the resonance wavelength shift can be expressed as:

$$\Delta\lambda = \lambda \frac{\Delta n_{eff} \Delta L}{n_{eff} L}$$

where $\lambda n_{eff}$ is the change in the effective refractive index of the material comprising the resonator, and $\Delta L$ is the change in the optical path length of the resonator.

In addition, resonators can be composed of semiconductor materials that exhibit electro-optic behavior. The effective refractive index of an electro-optic material is changed when an electric field is applied or charge carriers are injected. Thus, the resonance wavelength of a resonator can be electronically tuned by injecting current into the resonator (i.e., current tuning) or by applying a voltage to the resonator (i.e., electro-optic tuning). For electronic tuning, the resonance wavelength shift can be expressed as:

$$\Delta\lambda = \lambda \frac{\Delta n_{eff}}{n_{eff}}$$

Figure 3:
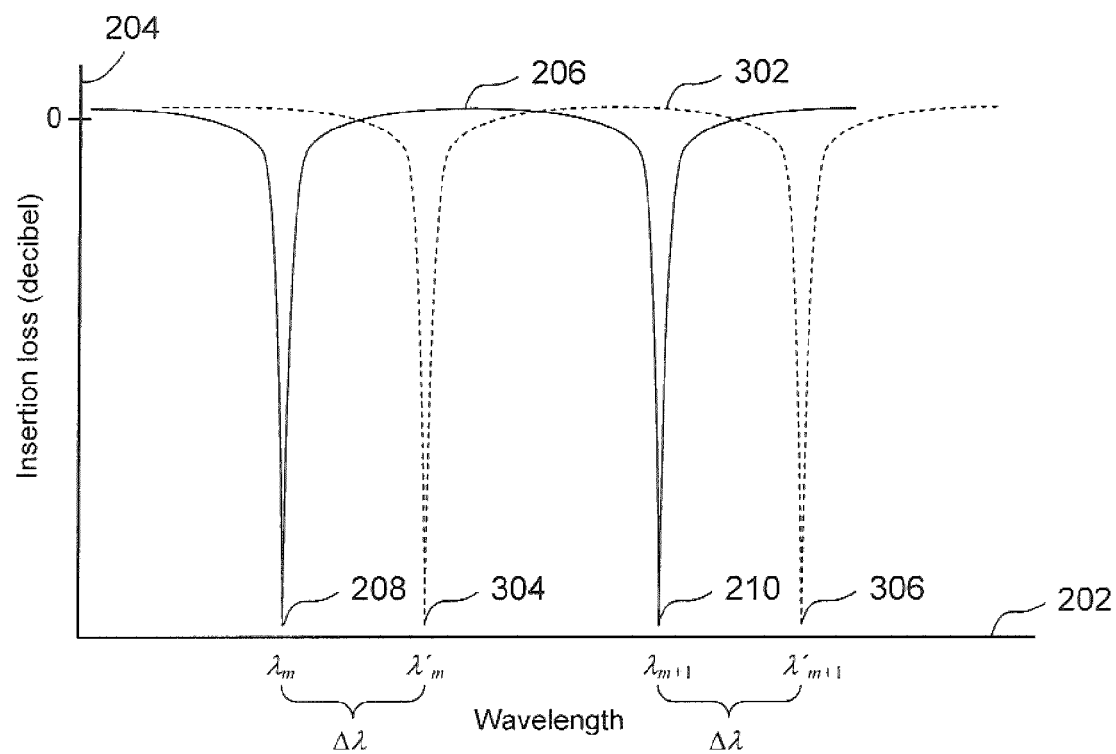
FIG. 3 shows a plot of insertion loss versus wavelength for a microring resonator and adjacent waveguide configured in accordance with embodiments of the present invention.

FIG. 3 shows a plot of insertion loss versus wavelength represented by dashed-line curve 302 for the resonator 102 and the waveguide 104, where the effective refractive index $n_{eff}$ and/or the optical path length L are changed as a result of temperature tuning or electronic tuning. Shifting the resonance wavelength of the resonator 102 by $\Delta\lambda$ shifts the insertion loss minima 208 and 210 associated with the wavelengths $\lambda_m$ and $\lambda_{m+1}$ to insertion loss minima 304 and 306 associated with the wavelengths $\lambda'_m$ and $\lambda'_{m+1}$. Comparing curve 302 with curve 206 reveals that light with the wavelengths $\lambda_m$ and $\lambda_{m+1}$, is no longer evanescently coupled from the waveguide 104 into the resonator 102, but light with wavelengths $\lambda'_m$ and $\lambda'_{m+1}$ is evanescently coupled from the waveguide 104 into the resonator 102.

Figure 4:
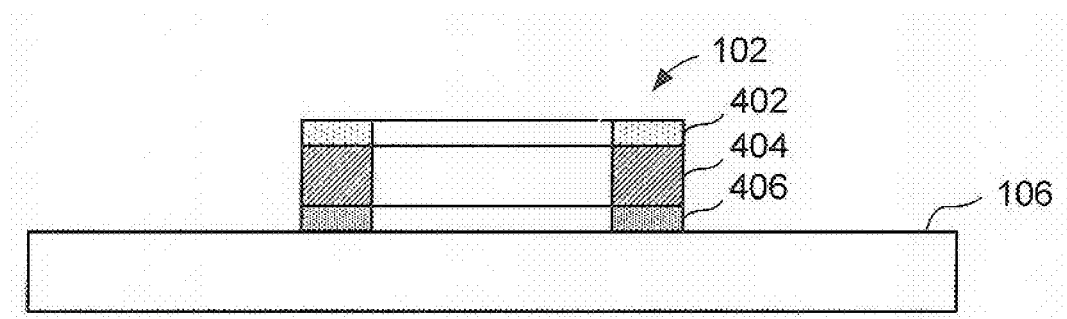
FIG. 4 shows a cross-sectional view of a first microring resonator configured for electronic tuning in accordance with embodiments of the present invention.

FIG. 4 shows a cross-sectional view of the resonator 102, along a line 4-4 shown in FIG. 1, configured for electronic tuning in accordance with embodiments of the present invention. In FIG. 4, resonator 102 can be composed of a wide variety of different semiconductor materials. For example, the resonator 102 can be composed of an elemental semiconductor, such as Si and germanium (Ge), or a III-V compound semiconductor, where Roman numerals III and V represent elements in the IIIa and Va columns of the Periodic Table of the Elements. Compound semiconductors can be composed of column IIIa elements, such as aluminum (Al), gallium (Ga), and indium (In), in combination with column Va elements, such as nitrogen (N), phosphorus (P), arsenic (As), and antimony (Sb). Compound semiconductors can also be further classified according to the relative quantities of III and V elements. For example, binary semiconductor compounds include semiconductors with empirical formulas GaAs, InP, InAs, and GaP; ternary compound semiconductors include semiconductors with empirical formula $GaAs_yP_{1-y}$, where y ranges from greater than 0 to less than 1; and quaternary compound semiconductors include semiconductors with empirical formula $In_xGa_{1-x}As_yP_{1-y}$, where both x and y independently range from greater than 0 to less than 1. Other types of suitable compound semiconductors include II-VI materials, where II and VI represent elements in the IIb and VIa columns of the periodic table. For example, CdSe, ZnSe, ZnS, and ZnO are empirical formulas of exemplary binary II-VI compound semiconductors.

The structure of resonator 102 for electronic tuning involves doping the upper cladding 402 with a p-type impurity, the core 404 of the resonator 102 can be intrinsic or lightly doped, and the lower cladding 406 can be doped with an n-type impurity. The layers 402, 404, and 406 form a p-i-n junction. P-type impurities can be atoms that introduce vacant electronic energy levels called "holes" to the electronic band gaps of the core 404. These impurities are also called "electron acceptors." N-type impurities can be atoms that introduce filled electronic energy levels to the electronic band gap of the core 404. These impurities are called "electron donors." For example, boron (B), Al, and Ga are p-type impurities that introduce vacant electronic energy levels near the valence band of Si; and P, As, and Sb are n-type impurities that introduce filled electronic energy levels near the conduction band of Si. In III-V compound semiconductors, column VI impurities substitute for column V sites in the III-V lattice and serve as n-type impurities, and column II impurities substitute for column III atoms in the III-V lattice to form p-type impurities. Moderate doping of the core 404 can have impurity concentrations in excess of about $10^{15}$ impurities/cm³ while more heavy doping of the core 404 can have impurity concentrations in excess of about $10^{19}$ impurities/cm³.

Figure 5A:
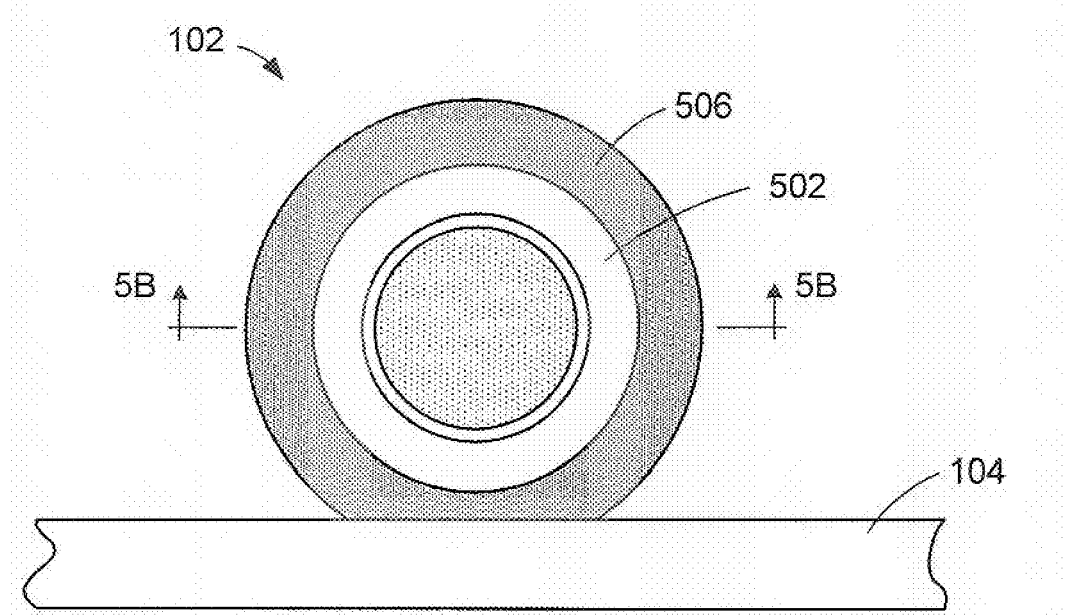
FIG. 5A shows a schematic representation and top view of a second microring resonator configured for electronic tuning in accordance with embodiments of the present invention.
Figure 5B:
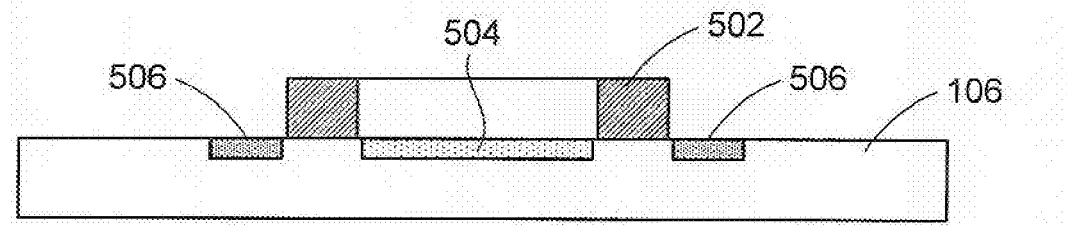
FIG. 5B shows a cross-sectional view of the microring resonator along a line 5B-5B, shown in FIG. 5A, in accordance with embodiments of the present invention.

In other embodiments, the resonator 102 can be electronically tuned by doping regions of the substrate 106 surrounding the resonator 102 and waveguide 104 with appropriate electron donor and electron acceptor impurities. FIG. 5A shows a schematic representation and top view of doped regions surrounding the resonator 102 and the waveguide 104 in accordance with embodiments of the present invention. FIG. 5B shows a cross-sectional view of the doped regions surrounding the resonator 102 along a ling 5B-5B, shown in FIG. 5A, in accordance with embodiments of the present invention. In certain embodiments, the resonator 102 comprises an intrinsic semiconductor ring 502, an n-type region 504 can be formed in the semiconductor substrate interior of the ring 502, and a p-type region 506 can be formed in the substrate 106 surrounding the outside of the ring 502. The ring 502, the p-type region 504, and the n-type region 506 also form a p-i-n junction.

In other embodiments, the p-type and n-type impurities of the resonators 102 shown in FIGS. 4 and 5 can be reversed.

When electrical contact is made to the p-type layer 402 and the n-type layer 406 or the p-type region 501 and the n-type region 502, the resulting p-i-n junction may then be operated in forward- or reverse-bias mode. Under a forward bias, a change in the index of refraction of the core 402 or the ring 502 may be induced through current injection. Under reverse bias, a high electrical field can be formed across the intrinsic core 402 or ring 502 and a refractive index change can result through the electro-optic effect. Both of these electronic tuning techniques provide only a relatively small shift in the effective refractive index of the resonator 102.

Electronic tuning provides relatively higher speed changes in the effective refractive index of the resonator 102 than thermal tuning. For example, electronic tuning can be accomplished in the nanosecond and sub-nanosecond time ranges, while thermal tuning can take place in the sub-millisecond or even millisecond time range. Thus, electronic tuning is suitable for coding information in unmodulated light. However, electronic tuning can only tune a resonator over a relatively limited range of wavelengths, on the order of several nanometers and is suitable for fine tuning of the resonance wavelength of the resonator 102. In order to adjust for inaccuracies in the fabrication of resonators or temperature changes due to variations in ambient temperature or lack of power dissipation of neighboring circuits, tuning over a wavelength range of at least 10-20 nm is desirable. Thus, electronic tuning cannot be effectively used. On the other hand, thermal tuning offers a greater or coarser resonance wavelength tuning range than electronic tuning, although at somewhat slower speeds.

II. Resonator Tuning Systems

Figure 6:
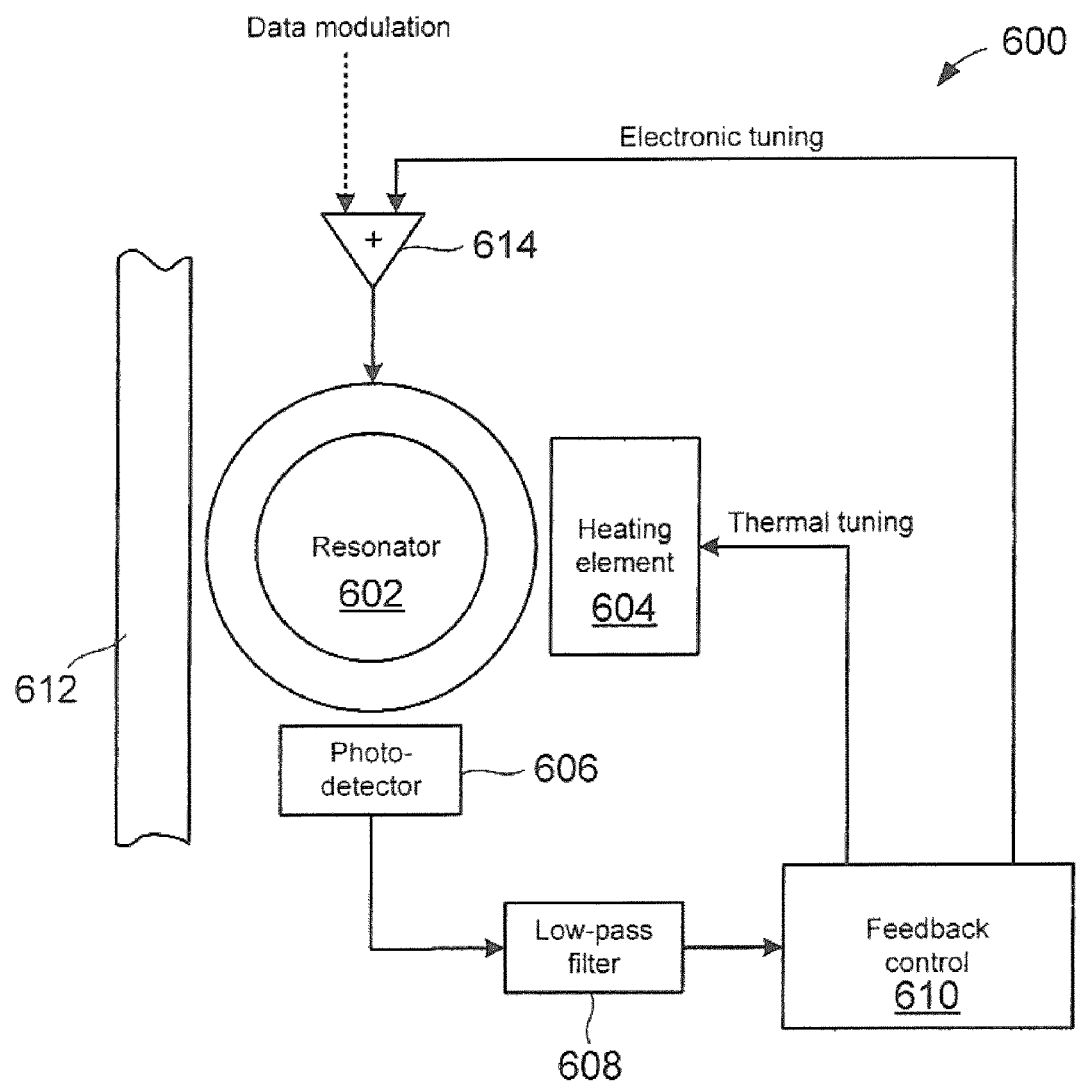
FIG. 6 shows a schematic representation of a resonator tuning system configured in accordance with embodiments of the present invention.

FIG. 6 shows a schematic representation of a resonator tuning system 600 configured in accordance with embodiments of the present invention. The system 600 comprises a resonator 602, a heating element 604, a photodetector 606, a low-pass filter 608, and a feedback control 610. The resonator 602 is disposed adjacent to a waveguide 612 and can be configured as a p-i-n junction, as described above with reference to FIGS. 4-5. As shown in FIG. 6, the system 600 can be configured and operated as a modulator by optionally including a summing amplifier 614 that receives as input an electronic tuning signal produced by the feedback control 610 and a modulated electronic data signal from a processor, memory or other electronic data generating electronic device. The summing amplifier 614 uses the electronic tuning signal to provide fine tuning adjustments in the offset of the electronic data signal. Otherwise, when the resonator 602 is operated as a detector to detect optical signals transmitted in the waveguide 612, the summing amplifier 614 can be excluded and the electronic tuning signal alone can be used to fine tune the resonator 602.

The photodetector 606 is disposed adjacent to the resonator 602 and is configured to detect light scattered from the resonator 606. The photodetector 606 can be configured as a pn junction or p-i-n junction photodetector that generates a photocurrent. Variations in the amplitude of the photocurrent correspond to variations in the intensity of the light scattered from the resonator 606. The low-pass filter 608 receives the photocurrent and generates an analog electronic feedback signal that represents the average photocurrent. The electronic feedback signal is sent from the low-pass filter 608 to the feedback control 610, which is electronically coupled to the heating element 604 and the resonator 602. Configuration and operation of the feedback control 610 is described in greater detail below in subsection IV.

The heating element 604 is electronically coupled to a variable current source located within and operated by the feedback control 610. The heating element 604 is positioned and composed of materials that through the process of Joule heating convert electrical current called a thermal tuning signal supplied by the variable current control into heat. The thermal tuning signal is sent from the feedback control 610 to the heating element 604 to provide coarse tuning of the resonator 602 due to variations in ambient temperatures or lack of power dissipation of neighboring circuits. The heating element 604 can be composed of platinum, nichrome, silicon carbide, molybdenum disilicide, polysilicon, or another suitable metal or alloy, or doped semiconductor that through resistance converts electrical current into heat. The heating element 604 can have many different shapes and thicknesses and have any suitable configuration.

Figure 7A:
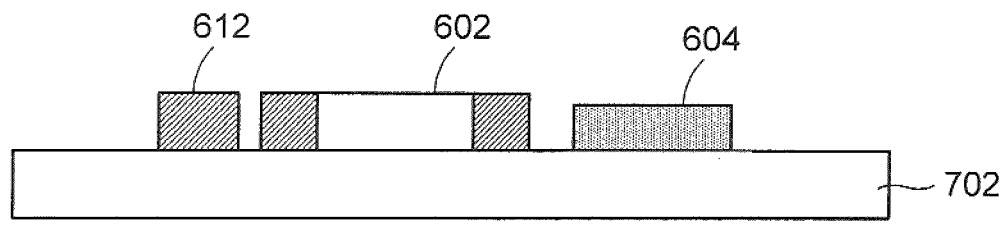
FIGS. 7A-7D show cross-sectional views of various positions of a resonator, a waveguide, and a heating element in accordance with embodiments of the present invention.
Figure 7B:
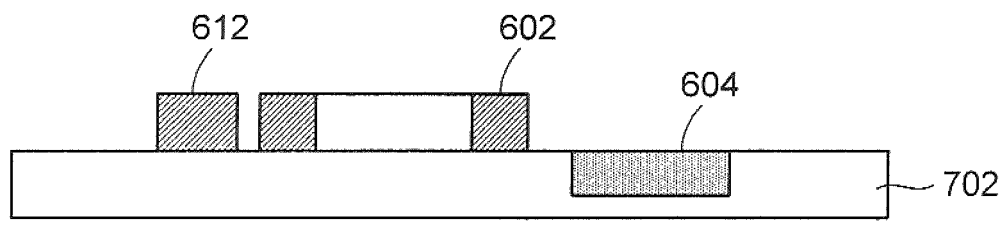
Figure 7C:
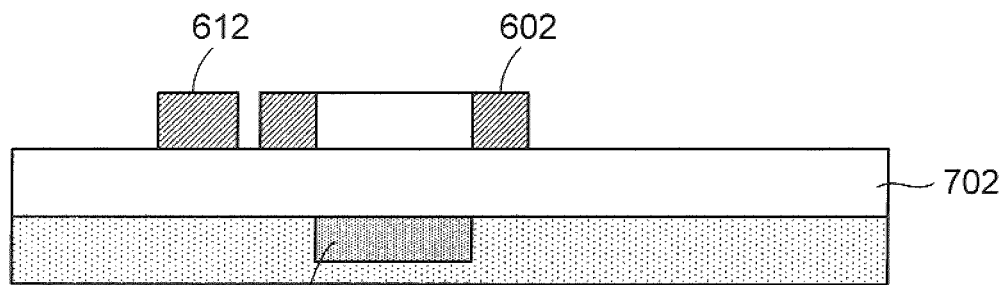
Figure 7D:
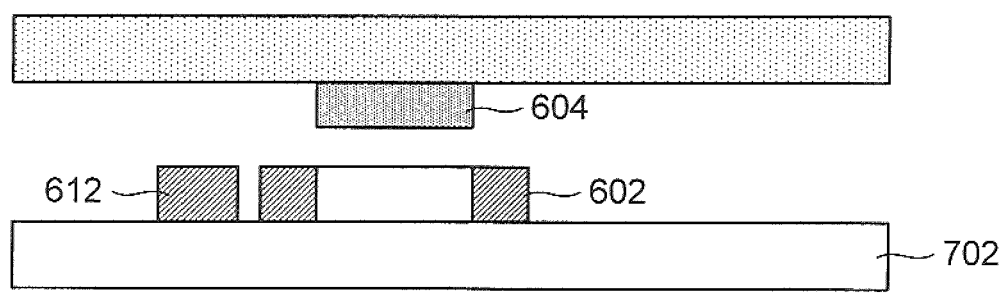

FIGS. 7A-7D show cross-sectional views of the resonator 602 and the waveguide 612 disposed on a substrate 702 and the heating element 604 positioned in accordance with embodiments of the present invention. In FIG. 7A, the heating element 604 is disposed on the substrate 702 adjacent to the resonator 602. In FIG. 7B, the heating element 604 is embedded in the substrate 702 adjacent to the resonators 602. In FIG. 7C the heating element 604 is embedded in a second substrate 704 and positioned beneath the resonator 602. In FIG. 7D, the heating element 604 suspended above the resonator 602. The position of the heating element 604 is not limited to the four positions shown in FIG. 7A-7D. It can be placed in any suitable position to provide even heating of the resonator 602.

III. DC Balanced Coding

Embodiments of the present invention employ DC balanced coding to monitor and tune the resonance wavelength of the resonator 602 as described below in subsection IV. When the resonator 602 is operated to modulate a wavelength of light, DC balanced coding is used to generate an optical signal. When the resonator 602 is operated to detect an optical signal, the optical signal was generated using DC balanced coding.

There are numerous well-known DC balanced coding methods and only a few of these methods are described here in the interest of brevity. In general, DC balanced coding methods provide DC balancing through only selecting code words which have an equal number of logic "1"s and logic "0"s. Examples of DC balanced coding include Manchester coding and its variations. This type of coding represents logical values as signal transitions and produces a code with at least one transition per code word. In other words, each logical value has at least one transition and occupies the same period of time. For example, in Manchester coding a logic "0" is identified by a "0" to "1" transition at the center of a bit and a logic "1" is indicated by a "1" to "0" transition at the center of a bit. In other embodiments, the transitions can be reversed. Another type of DC balanced coding is 4B/6B where all of the code words include three logic "1"s and three logic "0"s to provide DC balance. In other embodiments, 4B/8B DC balanced coding can be used to encode information with eight bit code words having four logic "1"s and four logic "0"s. A 4B/8B balanced code word has no more than two consecutive logic "1"s and logic "0"s. In other embodiments, 8B/10B DC balanced coding can be used to encode data. With 8B/10B coding, 8 bits of data are transmitted as a 10-bit entity called a symbol or character. The low 5 bits of data are encoded into a 6-bit group (the 5B/6B portion) and the top 3 bits are encoded into a 4-bit group (the 3B/4B portion). These code groups are concatenated together to form a 10-bit symbol. The two additional bits allow the number of "0" and "1" bits sent in a data stream over time to be balanced.

In addition to providing a basis for monitoring the performance and tuning of individual resonators, DC balanced coding can improve the performance of receiver circuits. To receive binary data a decision threshold must be set to distinguish between logic "1"s and "0s". When DC balanced coding is used, the time average of the input signal can be used as the decision threshold. This tracks variations in signal amplitude and level, improving the performance compared to receivers which use an absolute threshold DC balanced codes also aid with clock signal recovery. For example, with Manchester coding, each bit can correspond to one complete clock cycle. With other DC balanced codes, a receiver can generate a clock signal from an approximate frequency reference and then phase-align to the transitions in the data stream with a phase-locked loop. Thus, a clock signal can be recovered from the DC balanced data, which means a clock signal does not have to be sent separately from the data signal.

IV. Operation of the Resonator Tuning System

When the resonator 602 is operated as a modulator to encode information in an optical signal, the electronic data signal output from the summing amplifier 614 shifts the resonance wavelength of the resonator 602 in and out of resonance with a wavelength of light transmitted in the waveguide 612 by varying the bias voltage applied to the resonator 602. Modulation is binary, with logic "0" corresponding to the resonator 602 being resonant with the wavelength for a period of time. As a result, most of the light is couple from the waveguide 612 into the resonator 602 and dissipated through scattering losses with little light passing along the waveguide 612 to a detector. In order to encode in the optical signal logic "1," the resonator is moved off resonance so that light passes the resonator unattenuated for a period of time. Note that the assignment of logic "0" or "1" is arbitrary and can be reversed. In other words, in other embodiments, logic "0" corresponds to the resonator being "off" resonance with the wavelength for a period of time and logic "1" corresponds to the resonator being "on" resonance so that light passes the resonator unattenuated for a period of time.

When the resonator 602 is operated as a detector, the resonator 602 is ideally configured with a resonance wavelength substantially matching a particular wavelength of light transmitted in the waveguide 612. However, due to manufacturing defects or variations in ambient temperature or lack of power dissipation of neighboring circuits, the resonator 602 can be shifted off resonance with a particular wavelength of an optical signal. Thermal tuning and/or electronic tuning applied in accordance with embodiments of the present invention shift the resonance wavelength of the resonator 602 back to substantially match the wavelength of the optical signal in order for the optical signal to be evanescently coupled from the waveguide 612 into the resonator 602.

Figure 8A:
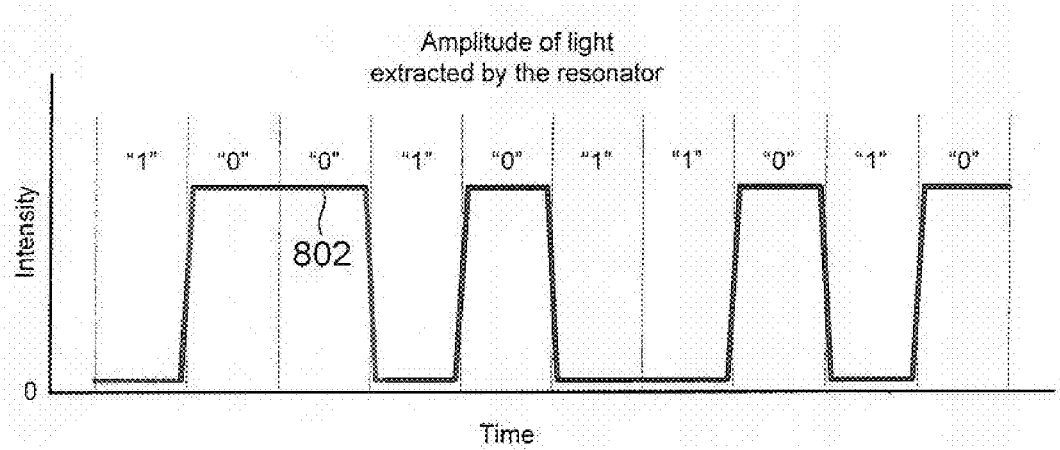
FIGS. 8A-8B show plots of exemplary intensity curves obtained in accordance with embodiments of the present invention.
Figure 8B:
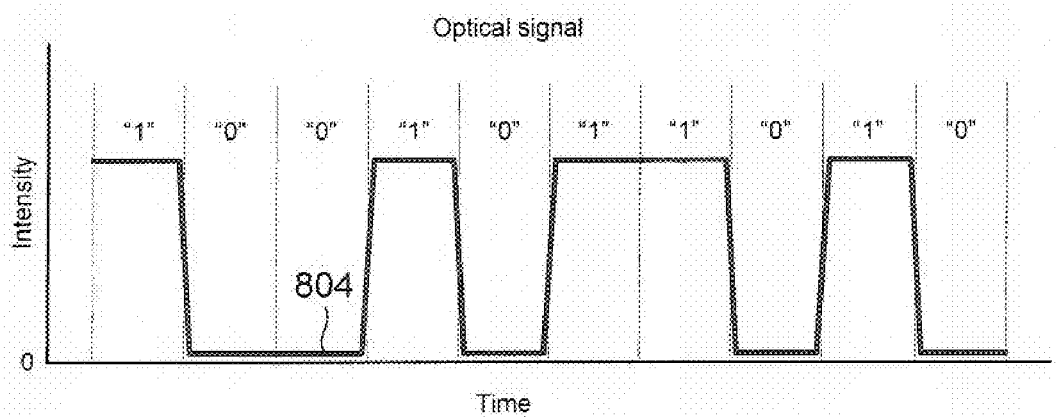

Whether the resonator 602 is operated to generate optical signals or detect optical signals, the intensity of the light scattered from the resonator 602 varies according to how accurately the resonator 602 is tuned. FIG. 8A shows a plot of an exemplary intensity curve 802 representing the intensity of light evanescently coupled into the resonator 602 in accordance with embodiments of the present invention. When the resonator 602 is operated as a detector, intensity curve 802 represents a 10-bit portion "0110100101" of a DC balanced optical signal coupled into the resonator 602, where logic "1"

and logic "0" are represented by relatively high and low intensities, respectively. On the other hand, when the resonator 602 is operated as a modulator to encode information in an optical signal, an intensity curve 804 shown in FIG. 8B represents a portion "1001011010" of the DC balanced optical signal carried by the waveguide 612, and intensity curve 802 comprises a complementary pattern of relatively high and low intensities associated with generating the optical signal 804. In order to generate the optical signal 804, the summing amplifier 614 transmits an electronic signal coding the portion "1001011010" as a pattern of "off" and "on" or "low" and "high" voltages or currents representing binary information. For example, a relatively "high" portion of the electronic signal can represent logic "1" and a relatively "low" or no voltage portion of the electronic signal can represent logic "0." Intensity curves 802 and 804 reveal that when relatively "high" voltage portions of the electronic signal corresponding to logic "1" are applied to the resonator 602, the resonance wavelength of the resonator 602 is shifted away from resonance with the wavelength of light and the light remains in the waveguide 612 substantially unattenuated, as shown in FIG. 8B. In contrast, when relatively "low" or no voltages corresponding to logic "0" are applied to the resonator 602, the resonance wavelength of the resonator 602 is shifted to substantially match the wavelength of light traveling in the waveguide 612. Intensity curve 802 reveals that for logic "0," light is evanescently coupled from the waveguide 612 into the resonator 602 where it can be detected by the detector 608, and intensity curve 804 reveals that for logic "0," light carried by the waveguide 612 drops off to substantially zero because much of the light is coupled into the resonator 602.

Figure 8C:
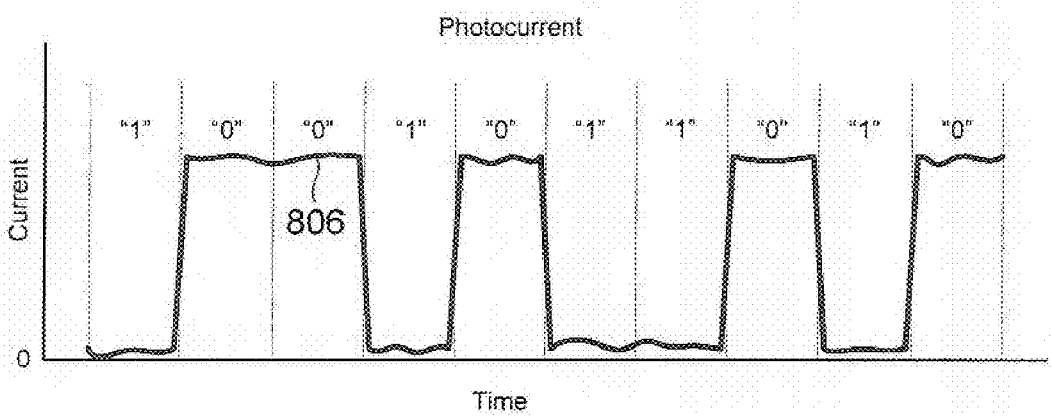
FIG. 8C shows a plot of an exemplary photocurrent with amplitude variations corresponding to intensity variations of the intensity curve shown in FIG. 8A in accordance with embodiments of the present invention.

The photodetector 608 generates a photocurrent with amplitude variations corresponding to variations in the intensity of the light scattered from the resonator 606. FIG. 8C shows a plot of an exemplary photocurrent 806 comprising a pattern of amplitudes that substantially matches the pattern of intensities comprising the intensity curve 802. The low-pass filter 608 receives the photocurrent and generates an analog electronic feedback signal representing an average of the variations in the photocurrent. As shown in FIG. 6, the feedback signal is sent to the feedback control 610.

Figure 9:
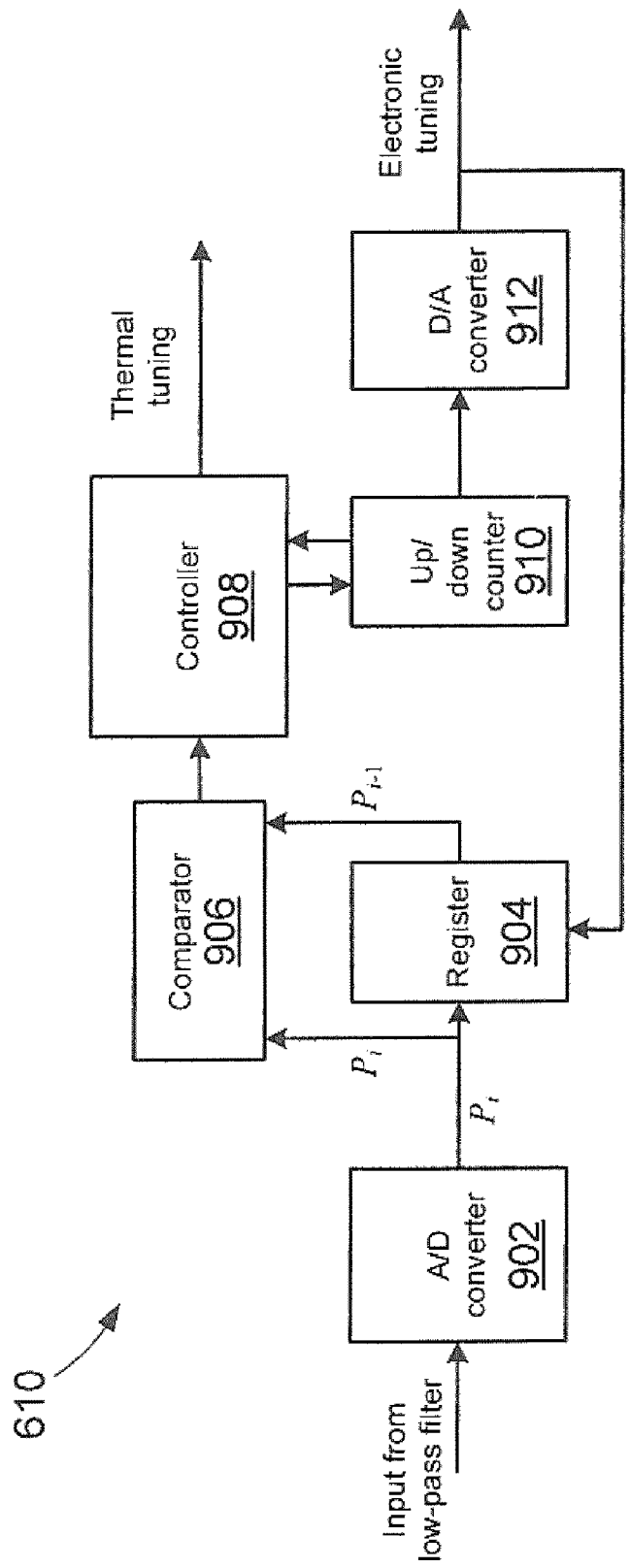
FIG. 9 shows a schematic representation of a feedback control configured in accordance with embodiments of the present invention.

The resonator tuning system 600 is configured and operated to try to maximize the feedback signal output from the low-pass filter 608 by repeatedly adjusting the resonance wavelength of the resonator 602. The feedback control 610 is configured to receive and analyze the feedback signal and to apply appropriate electronic and thermal tuning to the resonator 602. FIG. 9 shows a schematic representation of the feedback control 610 configured in accordance with embodiments of the present invention. The feedback control 610 includes an analog-to-digital ("A/D") converter 902, a register 904, a comparator 906, a controller 908, an up/down converter 910, and a digital-to-analog ("D/A") converter 912. Operation of the feedback control 610 is now described with reference to FIGS. 9-11 as follows.

The feedback signal generated by the low-pass filter 608 is periodically sampled by the A/D converter 902 and converted into a digital voltage or current representing a digital value $P_i$, where i is an index representing a period of time in which the feedback signal is sampled. As shown in FIG. 9, the digital value $P_i$ is sent from the A/D converter 902 to the comparator 906 and the register 904, which stores the current digital value $P_i$ and sends a digital value $P_{i-1}$ obtained from a previous sampling of the feedback signal to the comparator 906. The comparator 906 is an electronic device that compares the voltages or currents of digital values and sends a signal to the controller 908. The signal indicates whether the digital value $P_i$ is larger or smaller than the previous digital value $P_{i-1}$. The controller 908 also keeps track of a count, denoted by $C_i$. The controller 908 attempts to maximize the feedback control signal by adjusting the corresponding digital value $P_i$, such that $P_i \rightarrow P_{max}$, where $P_{max}$ represents a hypotheitcal maximum digital value corresponding to the maximum feedback control signal. Each time the feedback signal is sampled, the controller 908 determines a count $C_i$, which is associated with an amount of thermal and electronic tuning to apply to the resonator 602, as described below with reference to FIG. 11. The controller 908 determines the count $C_i$ as follows.

When $P_i$ is greater than $P_{i-1}$, the resonance wavelength of the resonator 602 moves closer to the wavelength of the light transmitted in the waveguide 612. If the controller 908 incremented the count $C_{i-1}$ associated with the previous $P_{i-1}$, the controller 908 increments the count $C_i$ as follows:

$C_i = C_{i-1} + 1$

However, if the controller 908 decremented the count $C_{i-1}$ associated with the previous $P_{i-1}$ the controller 908 decrements the count $C_i$ as follows:

$C_i = C_{i-1} - 1$

On the other hand, when $P_i$ is less than $P_{i-1}$, the resonance wavelength of the resonator 602 moves away from the wavelength of the light transmitted in the waveguide 612. If the controller 908 previously incremented the count $C_{i-1}$ associated with the previous $P_{i-1}$, the controller 908 decrements the count $C_i$ as follows:

$C_i = C_{i-1} - 1$

However, if the controller 908 decremented the count $C_{i-1}$ associated with the previous $P_{i-1}$, the controller 908 increments the count $C_i$ as follows:

$C_i = C_{i-1} - 1$

Figure 10A:
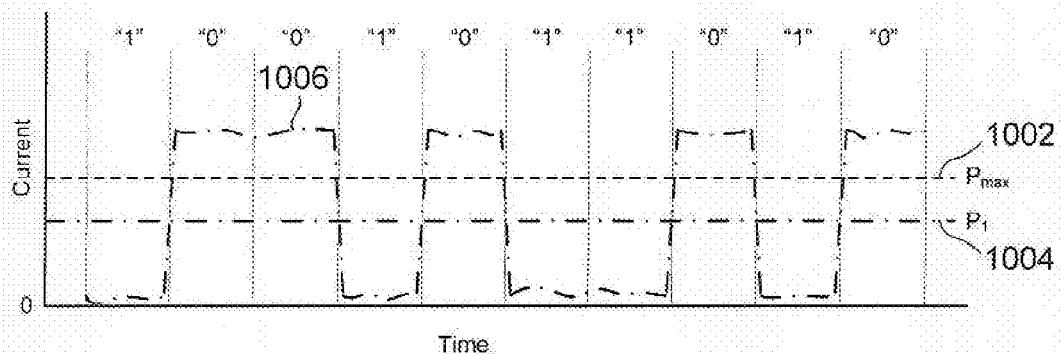
FIGS. 10A-10C show plots of exemplary feedback signals obtained in accordance with embodiments of the present invention.
Figure 10B:
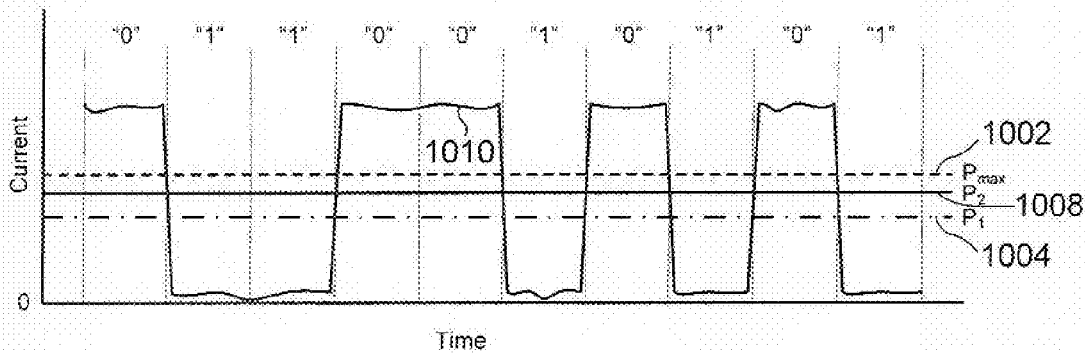
Figure 10C:
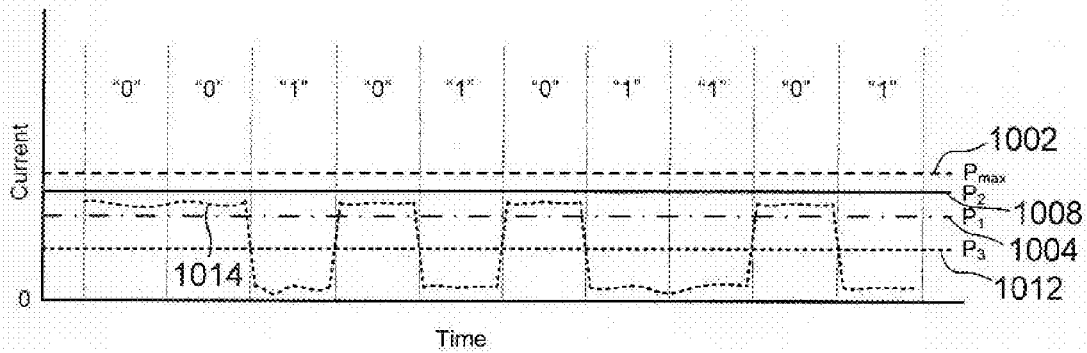

FIGS. 10A-10C show plots of three feedback signals and associated digital values obtained from three different hypothetical samplings of the feedback signal output from the low-pass filter 608 in accordance with embodiments of the present invention. In FIGS. 10A-10C, dashed line 1002 represents the maximum current a feedback signal can obtain when the resonance wavelength of the resonator 602 is ideally tuned to match the wavelength of light transmitted in the waveguide 612. The resonator tuning system 600 is configured and operated to try to move the feedback signal to the maximum 1002 by thermally and electronically tuning the resonator 602. In other words, moving the feedback signal closer to the maximum 1002, moves the resonance wavelength of the resonator 602 closer to the wavelength of the light of interest transmitted in the waveguide 612. In FIG. 10A, dot-dash line 1004 represents an exemplary feedback signal and associated digital value $P_1$ for the intensity curve 802, which is described above with reference to FIG. 8A and also reproduced in FIG. 10A as corresponding dot-dash intensity curve 1006. The feedback signal 1004 represents the average of the high and low intensities associated with the intensity curve 1006. In FIG. 10B, solid line 1008 represents a second exemplary sampling of the feedback signal and associated digital value $P_2$ associated with a second 10-bit portion of the DC balanced code represented by "0110010101." The feedback signal 1008 represents the average of the high and low intensities associated with the intensity curve 1010. In this case, $P_2$ is greater than $P_1$, which indicates that the resonance wavelength of the resonator 602 is moving closer to the wavelength of the light transmitted in the waveguide 612. If $C_1$ was incremented in the pervious sampling period, the controller 908 increments the count $C_1$ to obtain $C_2$, otherwise if $C_1$ was decremented in the previous period, the controller 908 decrements the count $C_1$ to obtain $C_2$. In contrast, FIG. 10C reveals a dotted line 1008 representing a third exemplary sampling of the feedback signal and associated digital value $P_3$ associated with a third 10-bit portion of the DC balanced code represented by "0010101101." The feedback signal 1012 represents the average of the high and low intensities associated with the intensity curve 1014. In this case, $P_3$ is less than $P_2$, indicating that the resonance wavelength of the resonator 602 is moving away from the wavelength of the light transmitted in the waveguide 612. If $C_2$ was decremented in the pervious period, the controller 908 increments the count $C_2$ to obtain $C_3$, otherwise if $C_2$ was incremented in the previous period, the controller 908 decrements the count $C_2$ to obtain $C_3$.

Returning to FIG. 9, the up/down count 910 stores tuning states, each tuning state corresponds to a particular count $C_i$. The up/down count 910 receives increment and decrement commands from the controller 908 and outputs an associated tuning state to the controller 908 and D/A converter 912. In response to the tuning state, the controller 908 outputs an appropriate thermal tuning signal to the heating element 604 and the D/A converter 912 outputs an electronic tuning signal to the resonator 602, optionally through the summing amplifier 614.

Figure 11A:
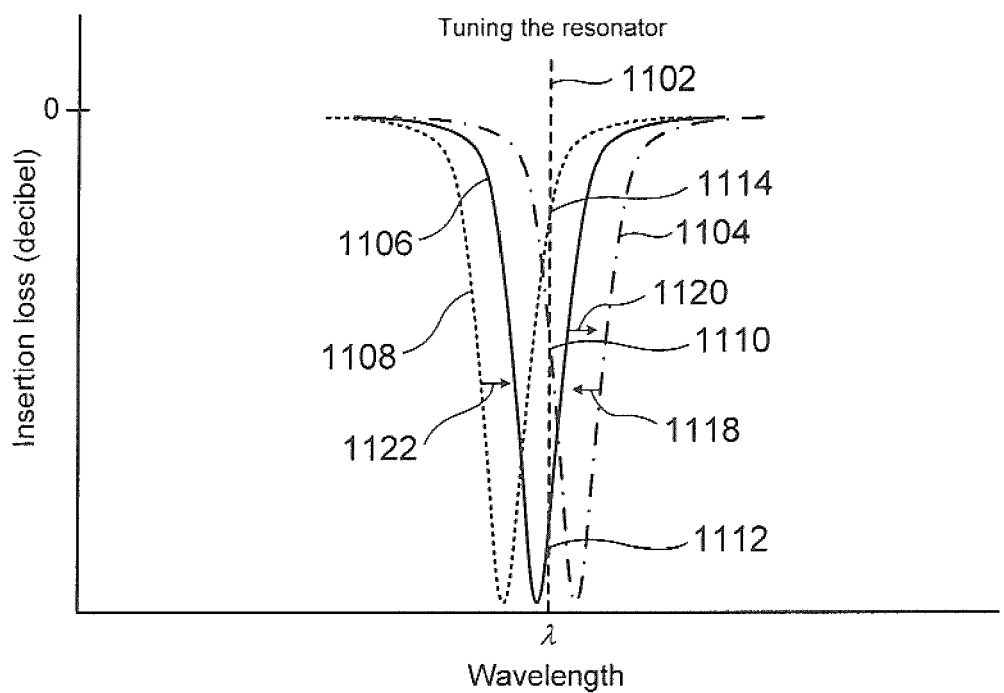
FIG. 11A shows a plot of insertion loss versus wavelength associated with three separate feedback signals shown in FIGS. 10A-10B in accordance with embodiments of the present invention.
Figure 11B:
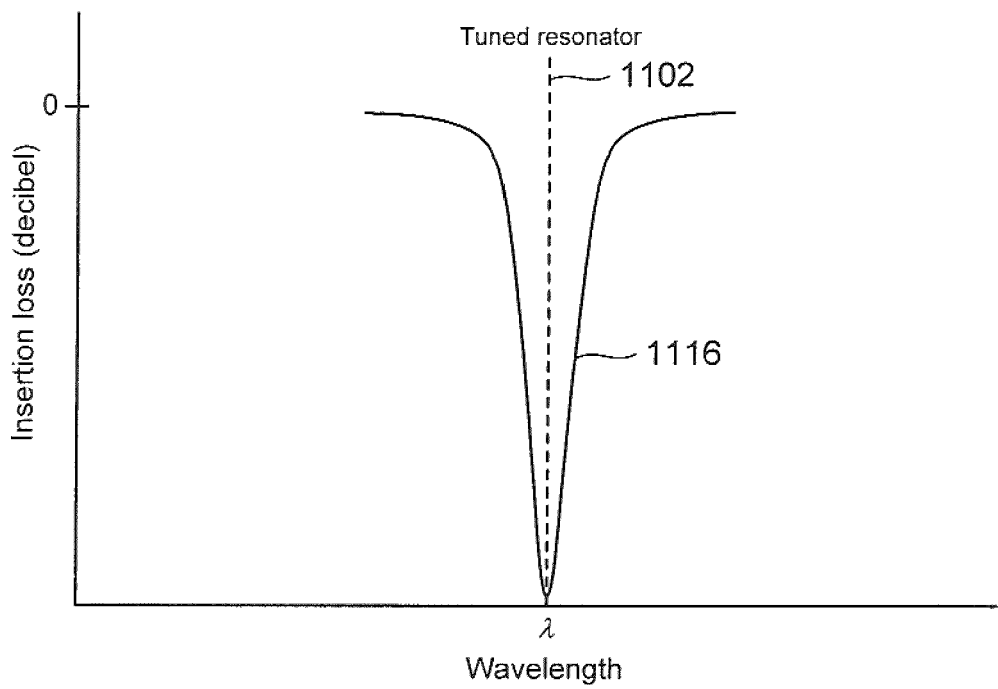
FIG. 11B shows a plot of insertion loss versus wavelength for a resonator on resonance with a wavelength of light λ in accordance with embodiments of the present invention.

FIG. 11A shows a plot of insertion loss versus wavelength for each of the feedback signals described above with reference to FIG. 10 in accordance with embodiments of the present invention. FIG. 11B shows a plot of insertion loss versus wavelength for the resonator 602 on resonance with a wavelength $\lambda$ of light transmitted in the waveguide 612 as represented by dashed line 1102. In FIG. 11A, dot-dashed curve 1104, solid curve 1106, and dotted curve 1108 represent the insertion losses of the resonator 602 associated with feedback signals 1004, 1008, and 1012, shown in FIG. 10. Points 1110, 1112, and 1114 correspond to where curves 1104, 1106, and 1108 intersect dashed line 1102 and represent the insertion loss for the wavelength $\lambda$, with the point 1112 corresponding to the largest relative insertion loss, the point 1114 corresponding to the smallest relative insertion loss, and the point 1110 corresponding to an intermediate insertion loss. In each of these cases, the up/down count 910 examines the count $C_i$ and determines an appropriate tuning state that is input to the controller 908 and the A/D converter 912. The controller 908 responds to the tuning by outputting an appropriate thermal tuning signal to the heating element 604, and the D/A converter 912 responds to the tuning state by outputting an electronic tuning signal to the resonator 602. For each $C_i$, the thermal and electronic tuning signals are selected to shift the resonance wavelength of the resonator 602 to substantially match the wavelength $\lambda$. In other words, as shown in FIG. 11A, the thermal and the electronic tuning signals corresponding to the count $C_i$ shift the resonance wavelength of the resonator 602 so that insertion loss curves 1104, 1106, and 1108, as indicated by corresponding directional arrows 1118, 1120, and 1122, to substantially match curve 1116 representing the ideal insertion loss shown in FIG. 11B. For example, shifting the curve 1106 to substantially match the curve 1116 may only require a relatively small electronic tuning whereas shifting the curve 1108 to substantially match the curve 1116 may require a substantially larger electronic tuning signal and a thermal tuning signal.

FIG. 9 also reveals that the register latches the electronic tuning signal to prepare for the next sampling of the feedback signal and tuning of the resonator 602.

Figure 12:
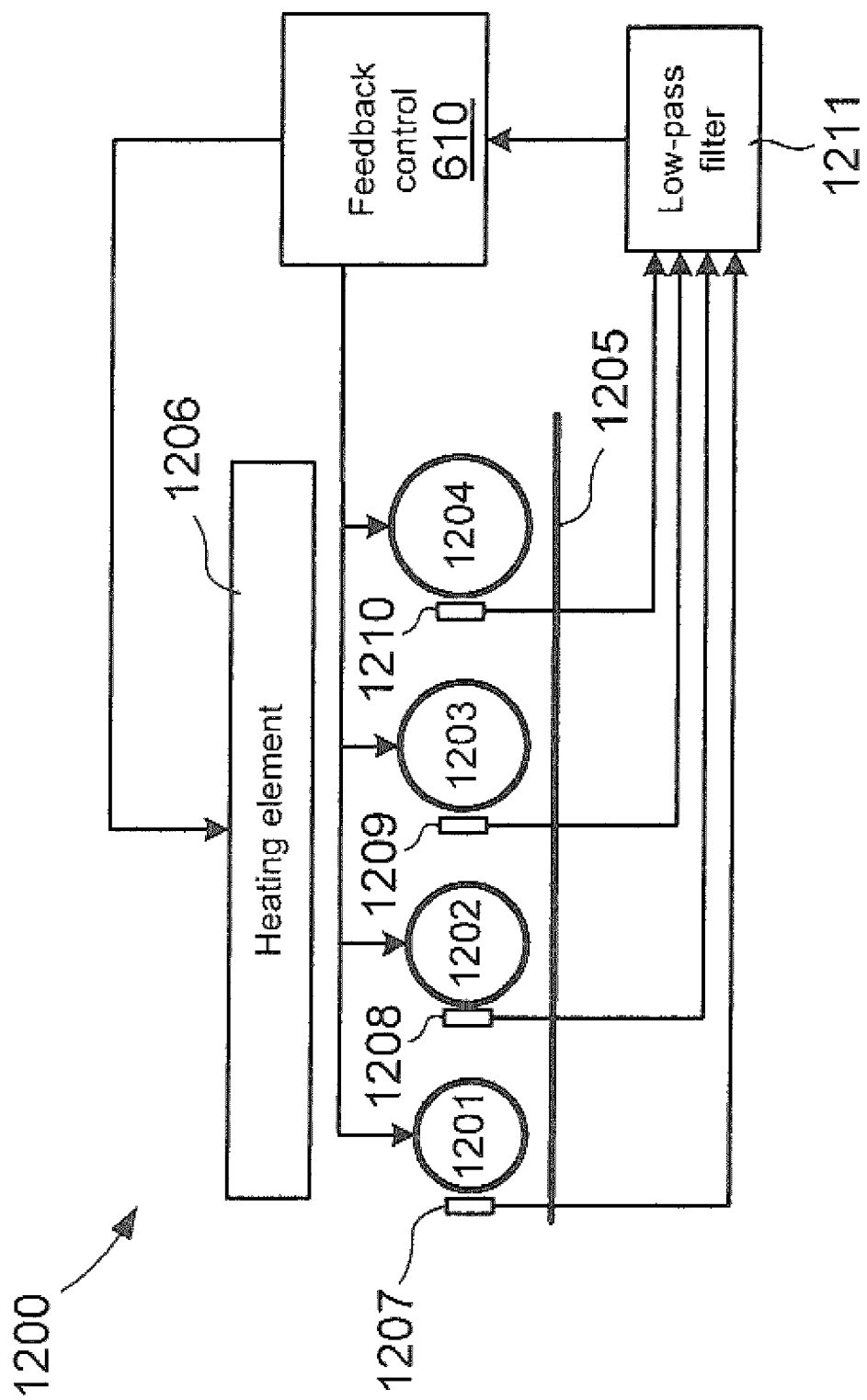
FIG. 12 shows a schematic representation of a resonator array tuning system configured in accordance with embodiments of the present invention.

In order to reduce costs associated with the feedback control 610, when dense-wave-division multiplexing is used, the feedback control can also control the tuning of an entire array of resonators, amortizing the cost across multiple resonators. For example, FIG. 12 shows a schematic representation of resonator array tuning system 1200 configured in accordance with embodiments of the present invention. The system 1200 comprises an array of four resonators 1201-1204 optically coupled to waveguide 1205, a heating element 1206, photodetectors 1207-1210, a low-pass filter 1211, and the feedback control 610. The feedback control 610 can be configured and operated as described above with reference to FIGS. 9-11.

V. Control-Flow Diagram

Figure 13:
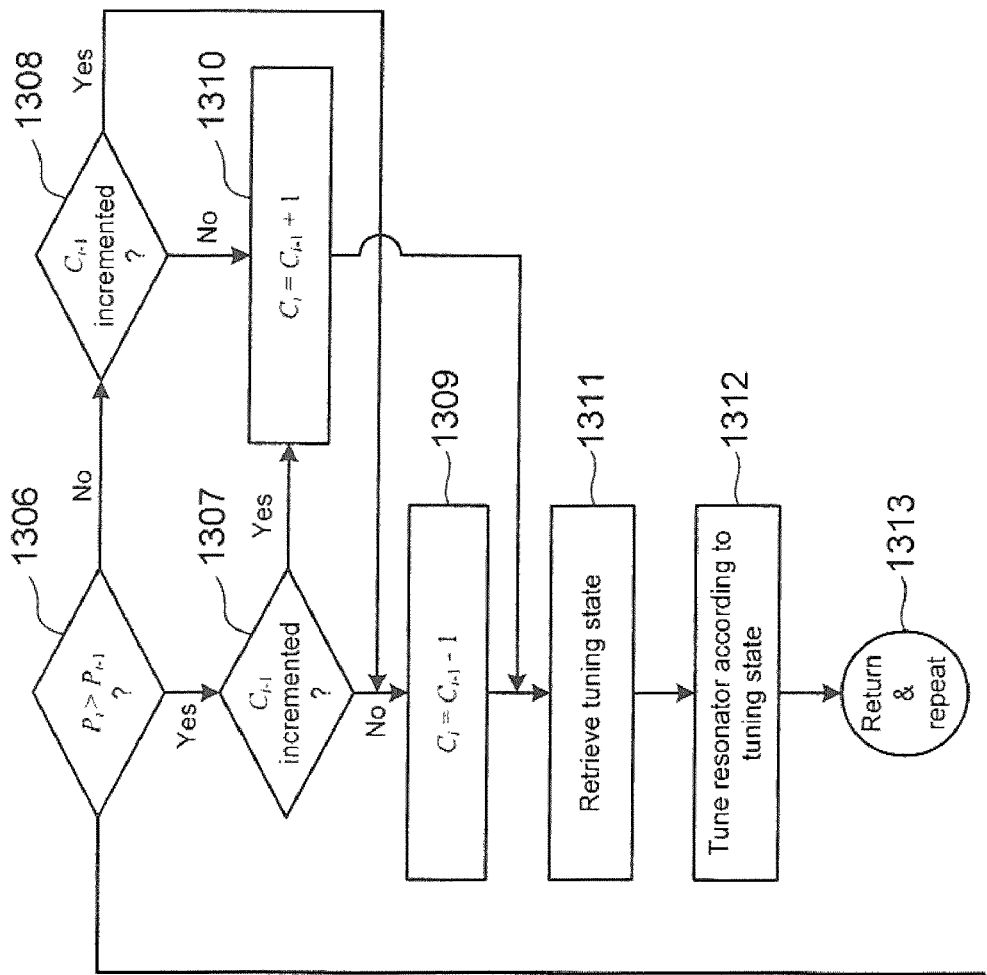
FIG. 13 shows a control-flow diagram for tuning a resonator in accordance with embodiments of the present invention.
Figure 13:
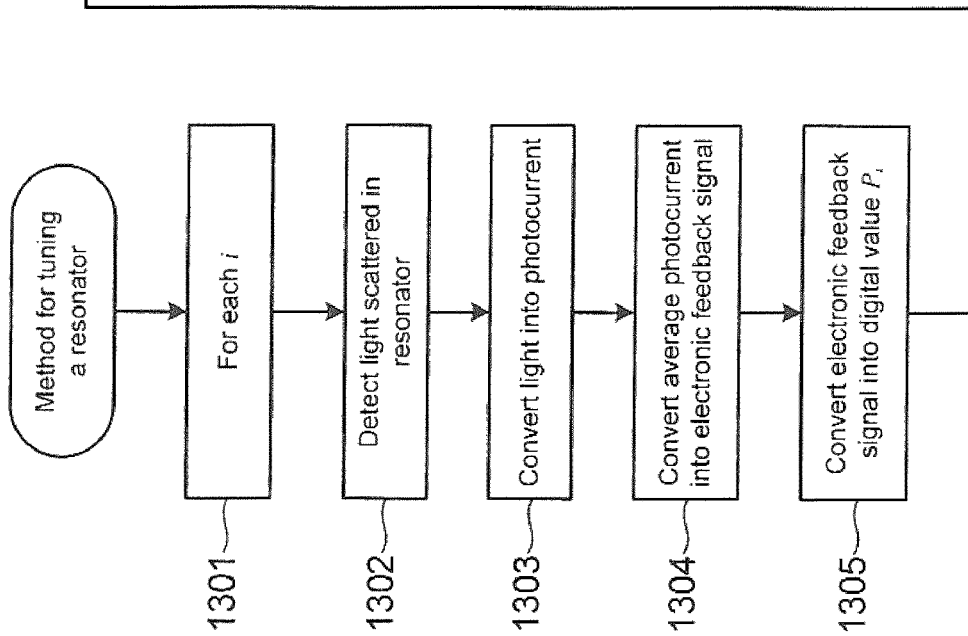

FIG. 13 shows a control-flow diagram for tuning a resonator in accordance with embodiments of the present invention. In the for-loop of step 1301, steps 1302-1311 are repeated for each sampling period i of the feedback signal. In step 1302, light circulating in a resonator is scattered, as described above with reference to FIGS. 6 and 8A. In step 1303, a portion of the scattered light is converted into a photocurrent, as described above with reference to FIGS. 6 and 8C. In step 1304, the photocurrent is converted into an analog feedback signal, as described above with reference to FIGS. 6 and 10. In step 1305, the feedback signal is converted into a digital value $P_i$. In step 1306, the digital value $P_i$ is compared with a digital value $P_{i-1}$ from a previous sampling period, as described above with reference to FIGS. 10A-10C. When $P_i$ is greater than $P_{i-1}$, proceed to step 1307, otherwise proceed to step 1308. In step 1307, if count $C_{i-1}$ was incremented in the previous sampling period i−1, proceed to step 1310, otherwise proceed to step 1309. In step 1308, if count $C_{i-1}$ was incremented in the previous sampling period i−1, proceed to step 1309, otherwise proceed to step 1310. In step 1309, compute count $C_i=C_{i-1}-1$. In step 1310, compute count $C_i=C_{i-1}+1$. In step 1311, retrieve a tuning state corresponding to the count $C_i$, as described above with reference to FIGS. 9 and 11A. In step 1312, tune the resonator according to the tuning state, as described above with reference to FIGS. 9, 11A, and 11B. In step 1313, return and repeat steps 1302-1313 for a subsequent sampling period i+1.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:
1. A system (600) comprising:
a resonator (602) disposed adjacent to a waveguide;
a photodetector system optically coupled to the resonator and capable of detecting light coupled into the resonator and generating a corresponding electronic feedback sig- nal that represents an average of DC balanced coding of data in relatively high and low intensities of the light; and a feedback control (610) electronically coupled to the photodetector system and the resonator, the feedback control system capable of thermally tuning and/or electronically tuning the resonator to couple with a particular wavelength of light transmitted in the waveguide based on the electronic feedback signal.

2. The system of claim 1 further comprising a heating element (604) disposed in proximity to the resonator and electronically coupled to the feedback control, the heating element operated by the feedback control to apply an appropriate amount of heat and substantially restore the operating temperature of the resonator.

3. The system of claim 1 wherein the photodetector system further comprises:

a photodetector (606) optically coupled to the resonator and capable of converting the light resonating in the resonator into a photocurrent having amplitude variations that correspond to the relatively high and low intensities of the light resonating in the resonator; and a low-pass filter (608) configured to average the amplitude variations in the photocurrent to generate the electronic feedback signal sent to the feedback control.

4. The system of claim 1 wherein the feedback control further comprises:

an analog-to-digital converter (902) configured to sample the electronic feedback signal and convert the sample of the electronic feedback signal into a first digital value;

a register (904) configured to store the first digital value;

a comparator (906) configured to determine the larger of the first digital value and a second digital value associated with a previous sample of the electronic feedback signal; and a controller system configured to generate an electronic tuning signal and a thermal tuning signal that shift the resonance wavelength of the resonator to substantially match the wavelength of light transmitted in the waveguide.

5. The system of claim 4 wherein the controller system further comprises:

a controller (908) electronically coupled to the heating element and configured to receive a digital value from the comparator and determine a count;

a digital-to-analog converter (912) electronically coupled to the resonator; and an up/down counter (910) configured to receive increment and decrement commands from the controller and determine a tuning state, wherein the tuning state sent to the controller and the digital-to-analog converter causes the controller to generate a thermal tuning signal sent to the heating element and the digital-to-analog converter generates an electronic tuning signal sent to the resonator.

6. The system of claim 1 further comprising a summing amplifier (614) electronically coupled to the resonator and the feedback control, the amplifier positioned to receive and an electronic tuning signal from the feedback control and accordingly adjusts the offset of an electronic data signal applied to the resonator.

7. The system of claim 1 wherein the resonator further comprises a p-i-n junction.

8. A method for tuning a resonator comprising:

converting light coupled into the resonator from an adjacent waveguide into an electronic feedback signal, the feedback signal representing an average of a DC balanced coding of relatively high and low intensities in the light; and determining a thermal tuning signal and/or electronic tuning signal based on the electronic feedback signal; and applying the thermal tuning signal and/or electronic tuning signal to the resonator to shift a resonance wavelength of the resonator to substantially match a particular wavelength of light transmitted in the waveguide (1313).

9. The method of claim 8 wherein converting the light coupled into the resonator from an adjacent waveguide into the electronic feedback signal further comprises:

converting the light into a photocurrent (1303); and converting the photocurrent into the electronic feedback signal (1304).

10. The method of claim 8 wherein determining the electronic tuning signal and the thermal tuning signal further comprises:

converting the electronic feedback signal into a first digital value (1305);

determining the larger of the first digital value and a second digital value associated with a previous sample of the electronic feedback signal (1306); and determining a count associated with a tuning state, the tuning state comprising the electronic tuning signal and the thermal tuning signal (1307-1309).

11. The method claim 10 wherein determining the count further comprises when the first digital value is greater than the second digital value, incrementing the count when the count associated with a previous digital value was incremented, or decrementing the count when the count associated with a previous digital value was decremented.

12. The method of claim 10 wherein determining the count further comprises when the first digital value is less than the second digital value, incrementing the count when the count associated with a previous digital value was decremented, or decrementing the count when the count associated with a previous digital value was incremented.

13. The method of claim 8 wherein applying the thermal tuning signal to the resonator further comprises converting the thermal tuning signal into heat that is applied to the resonator.

14. The method of claim 8 wherein applying the thermal tuning signal provides coarse tuning of the resonance wavelength of the resonator, and applying the electronic tuning signal provides fine tuning of the resonance wavelength of the resonator.

15. The method of claim 8 wherein applying the electronic tuning signal and the thermal tuning signal further comprises shifting the refractive index of the resonator.

* * * * *

UNITED STATES PATENT AND TRADEMARK OFFICE
CERTIFICATE OF CORRECTION

PATENT NO. : 7,977,622 B2  
APPLICATION NO. : 12/322896  
DATED : July 12, 2011  
INVENTOR(S) : Moray McLaren et al.

Page 1 of 1

It is certified that error appears in the above-identified patent and that said Letters Patent is hereby corrected as shown below:

In column 14, line 34, in Claim 11, after "method" insert -- of --.

Signed and Sealed this
Sixth Day of December, 2011

David J. Kappos
*Director of the United States Patent and Trademark Office*